Aug. 14, 1945.   I. B. HUMPHREYS   2,382,229
CONTROLLABLE PITCH PROPELLER
Filed June 19, 1940   2 Sheets-Sheet 1
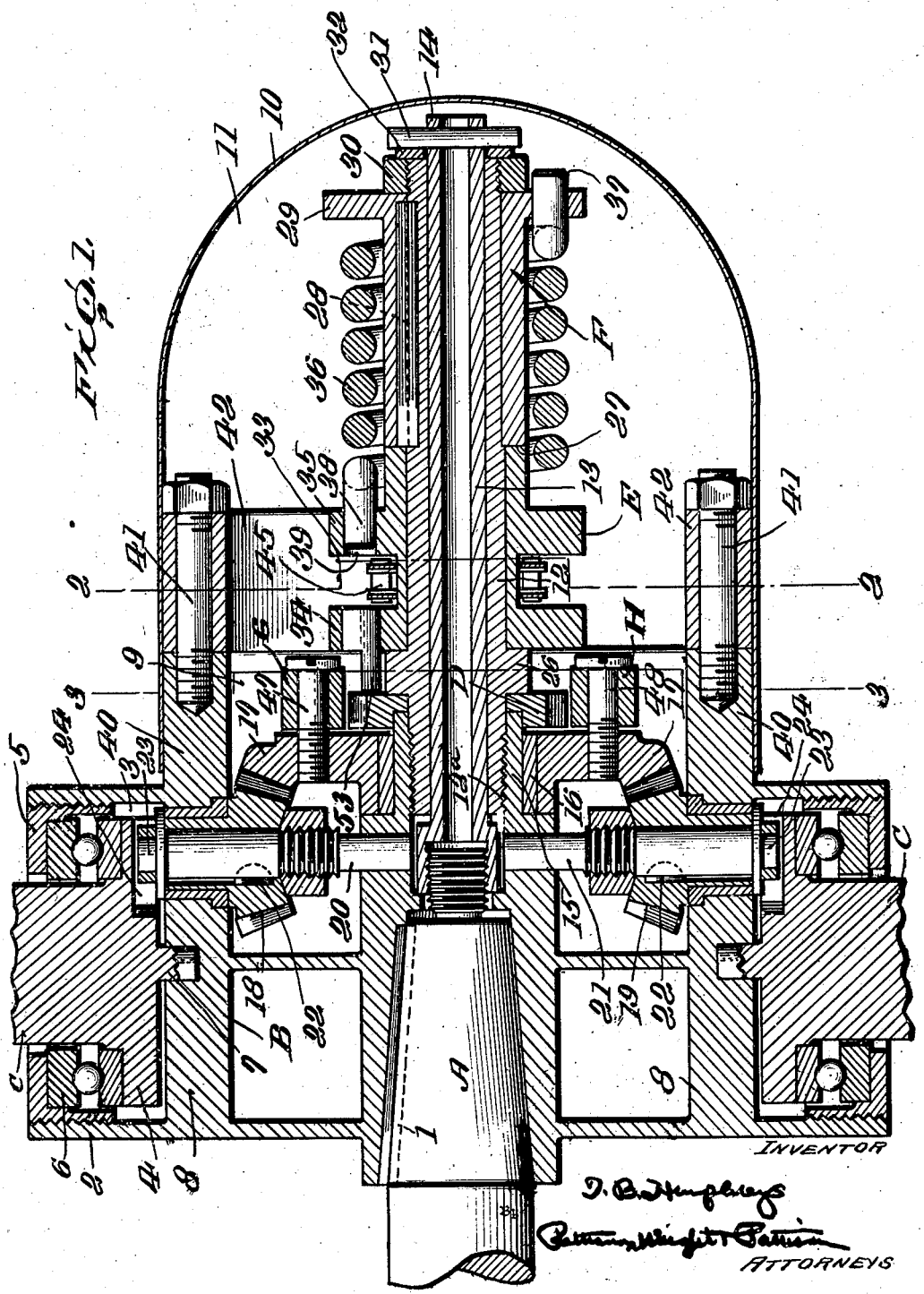
INVENTOR
ATTORNEYS Aug. 14, 1945.   I. B. HUMPHREYS   2,382,229
CONTROLLABLE PITCH PROPELLER
Filed June 19, 1940   2 Sheets-Sheet 2
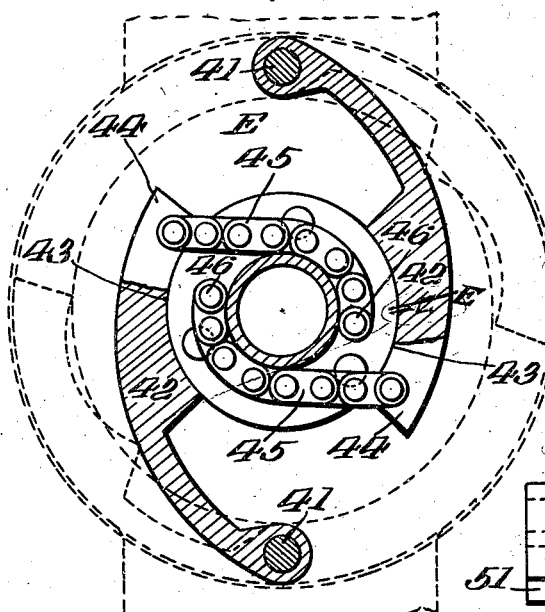
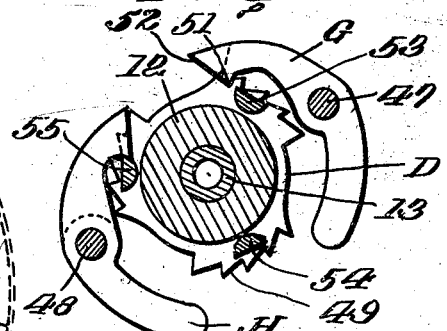
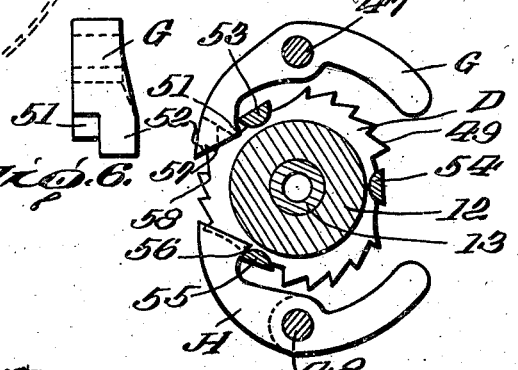
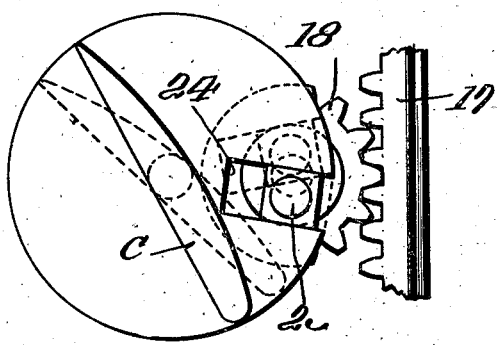
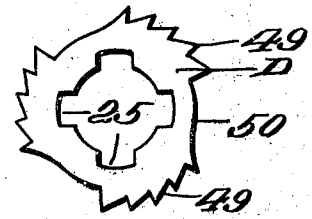
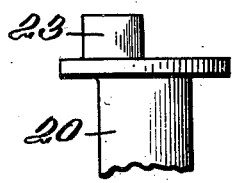
INVENTOR
I. B. Humphreys
By
ATTORNEYS Patented Aug. 14, 1945

2,382,229

UNITED STATES PATENT OFFICE 2,382,229

CONTROLLABLE PITCH PROPELLER

Ira B. Humphreys, Denver, Colo.

Application June 19, 1940, Serial No. 341,384

11 Claims. (Cl. 170—162)

The present invention pertains to a controllable or adjustable pitch propeller, and although the present improved device is primarily intended for use in connection with airplane propellers the principle of operation and the inventive concept could be utilized in connection wtih other propellers and mechanisms as will be readily recognized by those familiar with and skilled in this art.

An adjustable or controllable pitch propeller broadly is not new with me as varying constructions for adjusting the pitch of propellers, particularly airplane propeller blades, have been conceived and are actually in use, but insofar as I am aware all of these prior devices are quite complicated in nature which makes them costly of manufacture and installation and consequently prohibits their use on low priced airplanes.

One of the primary objects therefore of the present invention is the provision of an adjustable or controllable pitch propeller which is comparatively cheap of manufacture and installation.

The high cost of adjustable or controllable pitch propellers as heretofore made and used, has been brought about largely due to the inclusion of numerous intricate and costly parts which reflects itself not only in the cost of the final device but also tends to make the devices complicated which renders them liable to break-down and makes them costly of upkeep.

Another object of the present invention is therefore the provision of a controllable or adjustable pitch propeller which is extremely simple of construction yet highly efficient and durable in operation.

A further object of the invention is the provision of a controllable or adjustable pitch propeller in which the motive or driving power for altering the pitch of the propeller is obtained by or through the rotation of the propeller blades themselves when driven by the airplane engine and to provide a simple means for adjusting, at will, the pitch of the propeller blades.

In broad terms the primary object of the invention is that of utilizing centrifugal force to store energy and then utilizing, as and when desired, said stored force to change the pitch of the propeller blades.

I recognize that numerous and varying specific constructions can be utilized to practice my inventive concept, and consequently the accompanying drawings are merely illustrative of one form of construction which is suitable for practicing and putting into practical use my inventive concept.

In the drawings:

Fig. 1 is a sectional view through the propeller blade hub and the parts which I associate therewith to effect a change in the pitch of the propeller blades.

Fig. 2 is a sectional view on the line 2—2 of Fig. 1.

Fig. 3 is a sectional view on the line 3—3 of Fig. 1.

Fig. 4 is another sectional view on the line 3—3 of Fig. 1 with the parts in a different position.

Fig. 5 is a front end view of the ratchet.

Fig. 6 is an end view of the combined pawl and hook.

Fig. 7 is a diagrammatic view for the purpose of more clearly illustrating the manner in which the propeller blade pitch is changed.

Fig. 8 is a fragmentary detailed view of the eccentric which effects the change of pitch of the propeller blades.

In the drawings, where like numbers and reference characters are utilized to designate similar parts throughout the description, A is the outer end of the engine crank shaft which is keyed as at 1 to the propeller hub which is designated as an entirety by B. A two-blade propeller is illustrated but it will be understood that the present device can be used to change the pitch of a propeller having any number of blades.

The propeller blades C have their inner ends mounted for rotation on their longitudinal axes within suitable chambers 3 which extend radially outward from the hub B. The inner ends of the blades are each provided with a circumferential flange 4 and between this flange and the removable caps or closures 5 of the chambers 3 are positioned suitable roller ball bearings designated as an entirety by 6. At their innermost ends the blades are each provided with a short stub shaft 7 which is rotatable within a suitable seat provided in the outer wall 8 of the hub.

The hub outer open end 9 is closed by a forwardly extending cap 10 which provides a closed housing or chamber 11.

The hub B is provided with a tubular extension 12 which is threadedly attached to the hub as at 12a to rotate therewith. A sleeve 13 is attached to a threaded extension of the engine shaft and abuts the hub and retains it in place on the shaft. The outer end 14 of this sleeve extends beyond the outer end of tube 12.

The hub proper has a reduced portion 15 about which is disposed a bearing 16 upon which is rotatably disposed a gear 17 which has intermeshing and driving connection with a pair of bevel pinion gears 18 and 19 which are positioned at opposite sides of the hub and are rotatable with suitable outwardly extending shafts 20 and 21. The gears 18 and 19 are keyed as at 22 to their respective shafts so that upon rotation of the gears the shafts rotate therewith. These shafts extend outwardly through the outer side wall 8 of the hub B and their ends are each formed with an eccentric 23 (see Fig. 8 of the drawings) which is disposed within a seat or pocket 24 formed in the inner end of each propeller blade. The result of this construction is that as the shafts 20 and 21 are rotated the propeller blades are oscillated about their longitudinal axes which will change the pitch of the blades.

A ratchet D is positioned immediately adjacent the gear 17 and abuts the outer end of the reduced portion 15 of the hub. This ratchet centrally is provided with a depression or cut-out having a plurality of shoulders 25. The end of the hub portion 15 is of a cross sectional shape similar to the cut-out or depression in the ratchet with the result that the ratchet is held against rotation upon the hub and in driving relation therewith so as to rotate with the hub as the same is rotated by the engine crank shaft. The tube 12 is provided with a collar 26 which abuts the outer face of the ratchet and holds the same against longitudinal displacement.

A torsion hub E is mounted and freely rotatable upon the hub extension tube 12 and is held against longitudinal displacement by having abutment at one end with the aforementioned collar 26 and at its other end, as at 27, with the inner end of a spring holder F which is a tubular member disposed upon the hub extension tube 12 and keyed thereto for rotation therewith as at 28. This spring holder at its outer end is provided with a collar 29. A nut 30 retains the spring holder against longitudinal displacement.

The torsion hub E is provided with a circumferential channelway or groove 33. This groove in the hub provides oppositely disposed side walls which form collars 34 and 35. A coil spring 36 encircles the spring holder F and has its outer end 37 passing through a suitable opening in the holder collar 29 while the inner end 38 of the spring enters a suitable opening 39 in the torsion hub flange 33, all of which clearly appears in Fig. 1 of the drawings.

The outer end 40 of the hub wall 8 is provided with oppositely disposed and outwardly extending pivot pins 41 upon which are pivotally mounted for free rotation weights 42 the configuration of which clearly appears in Fig. 2 of the drawings where it will be seen that they are roughly semi-circular in configuration and have arc shaped faces 43 which lie closely adjacent or may even abut the torsion hub E. The free ends 44 of these weights are each attached by a chain 45 or other suitable flexible connector to the torsion hub as clearly appears at 46 in Fig. 2 of the drawings.

The outer face of the gear 17 is provided with a pair of outwardly extending pivot pins 47 and 48 which extend over the ratchet gear D. A combined pawl and hook G is pivotally mounted upon the pivot pin 47 while a hook H is pivotally mounted on the pivot pin 48. Having reference now particularly to Figs. 3 to 5 inclusive of the drawings it will be seen that the ratchet gear has on its outer periphery a plurality of ratchet teeth 49 but that these teeth are not continuous around the peripheral edge of the ratchet but are broken in three instances by three substantially straight edge portions 50 which are of considerable length.

The combined pawl and hook G is of a particularly peculiar construction in that it has, see Fig. 6 of the drawings, a pawl part 51 which is adapted to engage the ratchet teeth 49 of the ratchet and has a hook portion 52 which is adapted to engage with one of the torsion pins 53, 54 or 55 which are mounted in spaced relation in the collar 34 of the torsion hub E and extend into the path of travel of the hook portion 52 of the combined pawl and hook G. These pins are also in the path of travel of the hook H and on occasion are adapted to be engaged by the portion 56 of said hook, so that said hook may transmit clockwise rotation of torsion hub E to gear 17.

At this point it is pointed out, having reference to Figs. 3 to 5 of the drawings, that when the parts are in the position shown in Fig. 3 of the drawings the propeller blades are set at a low pitch but that as the pawls and hooks G and H move around the ratchet in a clockwise direction the pitch of the propeller blades changes until they have progressed throughout a complete cycle and moved from low to high pitch and back to low pitch. In other words, viewing Fig. 4 of the drawings where a high pitch adjustment of the propeller blades is illustrated, the torsion hub has been rotated clockwise by the unwinding rotation of the spring 36 and the pawl 51 has progressed over the lowest pitch setting notch of ratchet D; the medium low pitch setting notch; medium pitch setting notch 58 and medium high pitch setting notch 57 into high pitch setting notch. Further clockwise rotation of the torsion hub will, because of the eccentric connection with the blades, cause the blades to rotate in the opposite direction and move progressively back from high through the intermediate pitches to low pitch. Engagement of the pawl with the ratchet notch 58 would be a medium pitch setting of the blades. Engagement with the next notch would be a medium low setting, and engagement with the last notch would bring the propeller blades to a low pitch setting of the propeller blades which is the setting illustrated in Fig. 3 of the drawings. This feature of the invention will be more fully understood from the description of operation which follows hereinafter.

Prior to describing the operation of the device attention is called to the fact that the ratio between the gear 17 and the bevel pinion gears 18 and 19 is three to one, with the result that upon rotation of the gear 17 through 120 degrees the pinion gears have rotated one complete revolution and through their connection with the propeller blades have moved them through one complete cycle of from a low pitch setting through a high pitch setting and back to low.

It is to be further understood that the entire construction illustrated in Fig. 1 of the drawings is rotated with the engine drive or crank shaft and will of course be spinning as the drive shaft A is rotated for rotating the propeller blades. From the description thus far given it will be further understood that the ratchet D is fixed as to position and rotates with the propeller hub B.

By reason of the rotative or spinning movement of the entire device the weights 42 are subjected to a centrifugal force which will tend to cause them to swing outward upon their pivotal supports and this outward movement will exert a pull upon the chains 45 which pull will be translated into a rotative movement of the torsion hub E. Rotation of the torsion hub E is of course obtainable only against the resilient tension of the coil spring 36 and any rotative movement of the hub E in a counter-clockwise direction by reason of the outward movement of the weights will build up a force or power in the coil spring 36. In a device of this character it will be necessary to load the coil spring so that it will resist any outward movement of the weights until a predetermined speed of rotation of the engine crank shaft has been exceeded. In other words, the coil spring can be such as to permit any desired speed of rotation of the crank or drive shaft to be attained and movement of the weights under centrifugal force be resisted and prevented. The loading of the spring would be such as to permit the desired idling speed of the drive motor without any movement being permitted the weights.

In operation, change of pitch of the propeller blades is obtained by speeding up the drive motor and then slowing or throttling the same down. As the drive motor is speeded up to a speed beyond the predetermined idling speed the weights 42 will swing outwardly and by reason of the chain connection 45 between them and the torsion hub E they will as they move outwardly turn this hub in a counter-clockwise direction against the torsion or loading of the coil spring 36. As the hub E reaches the limit of its rotative movement one of the torsion pins 53, 54 or 55 will become engaged with the hook portion 56 of the pawl H carried by the gear 17. During this counterclockwise rotation of the torsion hub E no rotative movement has been imparted to the gear 17 and hence no change of pitch of the propeller blades has been obtained. To increase the pitch of the propeller blades it is necessary only to decrease or throttle down the rotative speed of the engine and its drive shaft A. Immediately upon slowing the drive shaft the centrifugal force exerted upon the weights 42 is reduced and the force built up within the coil spring 36 immediately acts to rotate the torsion hub E in a clockwise direction. As the torsion hub E is rotated clockwise it will, due to the connection between its torsion pin 55 and the hook 56 of the pawl H, rotate the gear 17 which in turn will rotate the bevel pinion gears 18 and 19 and through the eccentrics 23 rotate the propeller blades on their longitudinal axes and alter the pitch of the blades.

When the rotative speed of the engine shaft has been reduced sufficiently to permit the spring to rotate the propeller blades so that they have assumed the desired pitch the motor is speeded up and at this moment the pawl portion 51 of the combined pawl and hook G will engage one of the ratchet teeth 49 and will prevent the propeller blades from returning to a lower pitch as they would otherwise have a tendency to do by reason of the fact that with a properly designed propeller blade there is a tendency of the blade to twist into a low pitch position due to centrifugal force. I recognize that the air pressure upon the propeller blades tends to twist them into a high pitch position but the force exerted to move the blades to a high pitch position is considerably less than that exerted to move the blades to a low pitch position and hence the necessity of locking the blades, through engagement of the pawl with the ratchet, in their desired and accomplished set pitch.

The construction of the combined pawl and hook G and the ratchet is such that when the pawl portion 51 is engaged with any ratchet tooth except that particular one it engages when the propeller blades are set for a high pitch this engagement with the ratchet holds the hook portion 52 above the torsion pins 53, 54 and 55 so that the pins are not engaged by said hook. Consequently as the torsion pins are moved back as the motor speed is increased these pins pass under the hook without having engagement therewith. When however the high pitch position or setting of the propeller blades is reached, as illustrated in Fig. 4 of the drawings, the ratchet configuration is such as to have permitted the member G to drop lower and have the hook portion 52 thereof become engaged with the torsion pin 53. This engagement prevents the gear 17 from being pulled on around by the twisting force of the propeller blades which if permitted would defeat the high pitch setting of the blades and move them into a low pitch setting.

With the parts in the position illustrated in Fig. 4 of the drawings which is the highest pitch setting of the propeller blades, speeding up of the speed of rotation of the drive shaft will result in no movement whatever of the parts as the hooks of both of the pawls G and H are now in engagement with the torsion pins. Speeding up of the engine will increase the centrifugal force upon the weights which will endeavor to turn the torsion hub E in a counter-clockwise direction but this is prevented by engagement of the hook portion 52 of the pawl G with the torsion pin 53. If with the blades in the high pitch setting it were desired to land the airplane this is of course accompanied by a reduction in engine speed and upon said reduction in speed the centrifugal force exerted upon the weights is reduced, which in turn permits the coil spring 36 to rotate the torsion hub E to its limit in a clockwise direction. This clockwise rotative movement of the torsion hub will move the propeller blades into a low pitch position. Thus it will be seen that landing of the airplane is automatically accompanied by a low pitch setting of the propeller blades.

Accordingly it will be understood that the outward movement of the weights rotate the spring and store up energy therein which energy is released when the shaft R. P. M. is reduced and the weights move inwardly.

The released energy of the spring is in an unwinding direction and rotates the torsion hub E and the pins thereof in a clockwise direction and through the hook H the gear 17 is clockwise rotated. Continued rotation of the torsion hub will oscillate the propeller blades and progress them from low pitch to high pitch setting and then back through the intermediate settings to low pitch setting. The blades are never set at a negative pitch.

An additional feature is to be found in the fact that if after slowing the motor for landing and thus setting the propeller blades at a low pitch it were found necessary to climb again before making a landing, the blades would remain in a low pitch because a change in pitch of the propeller blades could not be obtained without leveling the plane off to attain a high speed of rotation of the drive shaft and thereafter throttling the motor to reduce the speed of drive shaft rotation.

From the foregoing it will soon be seen that I have provided a device for changing the pitch of propeller blades which is extremely simple of construction and simple and convenient of operation yet highly efficient in use, and constitutes a device wherein when a low pitch setting of the blades is desirable, such as in landing, this setting is automatically obtained through normal engine speed control during said landing operation.

The invention is to be limited only within the scope of the hereinafter appended claims.

I claim:

1. In a device of the character described the combination comprising, a driven rotary propeller shaft having attached thereto for rotation therewith a plurality of propeller blades, said blades being mounted for rotation about their longitudinal axes to vary their pitch, power storage means operatively connected to said blades for rotating them and altering their pitch, means operable by the centrifugal force of said rotary drive shaft for storing power in said power storage means, said last named means operating to store power in said power means upon speeding the rotation of said propeller shaft above a predetermined minimum speed of rotation, said connection between the power means and the propeller blades operating to progressively rotate and progressively change the pitch of said propeller blades upon repeated accelerations and de-accelerations of said propeller shaft, between the power means and said blades being a one-way drive connection which operates to rotate said blades only when said power means is dispensing its stored power.

2. In a device of the character described the combination comprising, a driven rotary propeller shaft having attached thereto for rotation therewith a plurality of propeller blades, said blades being mounted for rotation about their longitudinal axes to vary their pitch, a coil spring loosely surrounding said propeller shaft and having one end anchored agains axial rotation and its other end free for axial rotation, a rotary element mounted for free rotary movement on said shaft and connected to the free end of said spring, a member rotatable with said shaft and movable in respect to said shaft in response to centrifugal force when said shaft is rotated, said member being connected to said rotary element and acting to rotate said element in a direction to wind said spring by axially rotating its free end when said member moves in response to centrifugal force, a driving connection between said rotary element and said propeller blades adapted to oscillate said blades about their longitudinal axes and said connection being a one-way drive connection and operating to oscillate said blades only when said rotary element is rotated in response to the rotary power stored in said spring.

3. A construction as defined in claim 2 wherein, the driving connection between the rotary element and the blades includes a second rotary element provided with a hook and with a pawl, a fixed ratchet engaged by said pawl and acting to permit rotation of said second rotary element in one direction only, said first rotary element provided with a pin for periodically engaging the hook of the second rotary element and rotating the same when the spring rotates to expend stored rotary power therein, and said pin and hook engaging one another only after the speed of rotation of the propeller shaft has been increased and is being decreased.

4. A construction as defined in claim 2 wherein, the member which moves in response to centrifugal force is pivotally mounted and swings outwardly from the propeller shaft, the connection between said rotary element and said propeller blades comprising a rotatable gear which engages a gear associated with each propeller blade, said gears which are associated with each propeller blade being eccentrically connected to its respective blade for oscillating said blade about its longitudinal axis upon rotation of said gear, a fixed ratchet, a pawl carried by the first named gear having engagement with said ratchet and permitting said gear to be rotated in one direction only, and the connection between said rotary element and a connection between said rotary element and said first named gear providing a one-way drive and acting to rotate said gear only when said rotary element is rotated in response to the unwinding of said coil spring by the force of stored rotative force in said spring.

5. A self-contained controllable pitch propeller, comprising a hub, a blade spindle turnably mounted in the hub, a resiliently restrained centrifugal controlling element in the hub movable between inner and outer positions, and a mechanical connection between the controlling element and the blade spindle including means to increase and then decrease the pitch of the blade during movement of the controlling element from its outer to its inner position, means permitting movement of the controlling element from its inner to its outer position without decreasing the pitch of the blade, and means locking the blades in any one of a plurality of predetermined pitch settings.

6. A driven rotatable hub having a plurality of propeller blades attached thereto and rotatable therewith, said blades being additionally rotatable on their longitudinal axes to permit the pitches of said blades to be altered, a rotary element operatively connected with said blades to rotate the same on their longitudinal axes, a lock permitting said rotary element to be rotated in one direction only, a weight rotatable with said hub and movable in respect thereto in response to centrifugal force when said hub is rotated, power means connected to said weight, ratchet means acting to provide driving connection between said rotary element and said weight, and the movement of said weight in response to centrifugal force acting to energize said power means, whereby said power means may act to vary the pitch of said propeller blades.

7. A construction such as defined in claim 6, wherein said weights move in response to centrifugal force only when a predetermined speed of rotation of said propeller hub has been reached or exceeded, and said power means acts to alter the pitch of said propeller blades only after said predetermined speed of rotation of said propeller hub has been reached or exceeded and then been reduced.

8. A drive shaft and a hub rotatable therewith having a plurality of propeller blades attached thereto, said blades being held against radial movement but mounted to permit oscillation thereof about their longitudinal axes to alter the pitch of said blades, a rotatable element operatively connected to said blades to oscillate the same, a coil sping having one end fixed against rotation and a free end connected to said rotary element, a weight rotatable with said hub and radially movable in respect thereto in response to centrifugal force when said hub is rotated, a connection between said weight and said rotary element for causing said rotary element to be rotated in one direction by the centrifugal movement imparted to said weight, said spring causing said rotatable element to be rotated in the opposite direction when said weight is exerting less force upon said rotary element than is said spring, and the connection between the rotary element and the blades being a one-way drive connection which operates to oscillate said blades only when said rotary element is rotated by the spring.

9. In a variable pitch propeller, a driven rotatable hub having a plurality of propeller blades attached thereto and rotatable therewith, said blades being additionally rotatable on their longitudinal axes to permit the pitches of said blades to be altered, a rotary element which is rotatable in one direction only, a connection between said rotary element and said blades to rotate the blades on their longitudinal axes, means in said connection between said rotary element and said blades causing said element while always rotating in the same direction to rotate said blades about their longitudinal axes in one direction and then in the opposite direction, a weight rotatable with said hub and movable in respect thereto in response to centrifugal force, power means attached to said weight and to said rotary element, said connection adapted to convert the rotary movement of the power means to an oscillatory movement of the blades, the movement of said weight in response to centrifugal force acting to store rotative power in said power means, and said power means when the power therein is sufficient to overcome the centrifugal force of said weight acting to rotate said rotary element to vary the pitch of said propeller blades in the manner described.

10. A construction as defined in claim 8 wherein, means is provided for locking the blades against movement to a low pitch setting in response to the force exerted upon them by reason of their rotation with the propeller shaft.

11. A construction as defined in claim 8 wherein, means is provided and operates at all pitch settings of the blades between their low and high pitch settings to lock said blades against movement to a low or lower pitch setting in response to the force exerted upon them due to their rotation with the propeller shaft, and additional lock means is provided for preventing the same aforesaid alteration of blade pitch in response to the aforementioned force when the blades are set at their highest pitch.

IRA B. HUMPHREYS.